T. DAVIS.
SHOCK ABSORBER.
APPLICATION FILED MAY 2, 1919.
1,337,345.
Patented Apr. 20, 1920.
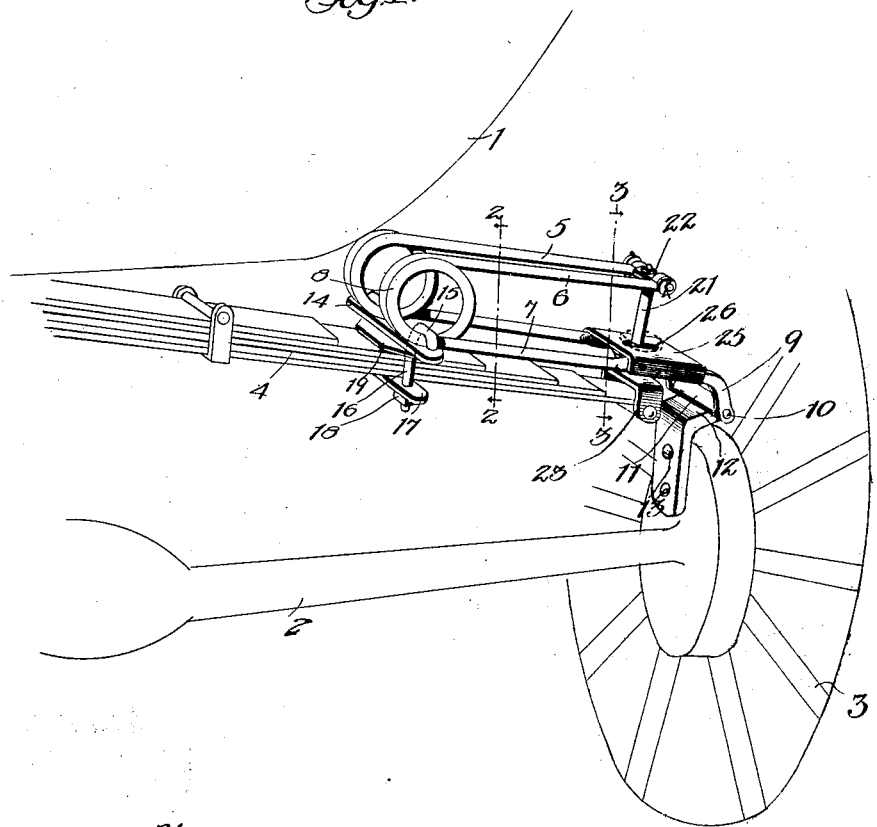
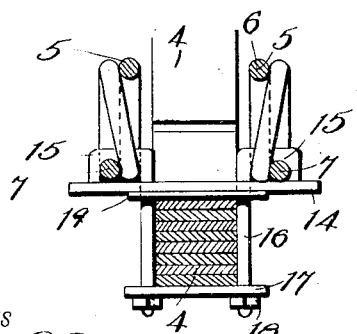
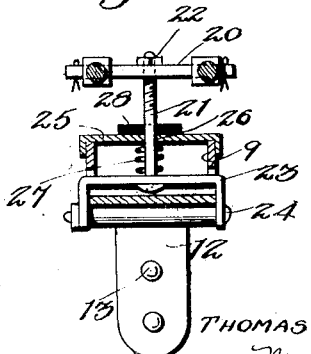
WITNESSES
INVENTOR
THOMAS DAVIS,
BY Munn&Co
ATTORNEYS

UNITED STATES PATENT OFFICE.

THOMAS DAVIS, OF MOUNDS, OKLAHOMA.

SHOCK-ABSORBER.

1,337,345.  Specification of Letters Patent.  Patented Apr. 20, 1920.

Application filed May 2, 1919. Serial No. 294,253.

*To all whom it may concern:*

Be it known that I, THOMAS DAVIS, a citizen of the United States, and a resident of Mounds, in the county of Creek and State of Oklahoma, have invented certain new and useful Improvements in Shock-Absorbers, of which the following is a specification.

This invention relates to an improvement in shock absorbers for motor vehicles.

One of the principal objects of the invention is to provide an improved shock absorber so constructed as to resiliently suspend the springs of the vehicle in such a manner as to relieve the springs of a portion of the road shocks.

A further object is to provide a device of this class wherein compression and rebound occur without danger of breaking the vehicle or shock absorber springs.

Another object is to provide an absorber in which the tension of the spring utilized in absorbing the road shock may be adjusted to suit various conditions of service.

Still another object of the invention is to provide an improved shock absorber which will be relatively simple, durable, efficient in operation, and inexpensive to manufacture and maintain.

With these and other objects in view which will become apparent as the description proceeds, the invention resides in the construction, combination and arrangement of parts hereinafter more fully described and claimed and illustrated in the accompanying drawing, in which like characters of reference indicate like parts throughout the several figures of which:

Figure 1 represents a view in perspective of a portion of a motor vehicle, showing my improved shock absorber applied thereto.

Fig. 2 represents a view in section taken transversely on the plane indicated by the line 2—2 of Fig. 1, looking in the direction indicated by the arrows.

Fig. 3 represents a view in section taken on the plane indicated by the line 3—3 of Fig. 1 looking in the direction indicated by the arrows.

Referring more particularly to the drawing, 1 indicates the body of a vehicle, 2 indicates the axle, 3 the wheel and 4 the vehicle spring, such spring being positioned above the axle in alinement therewith.

The shock absorber forming my invention is applied to the spring as indicated in Fig. 1. It includes a pair of U-shaped spring members 5, arranged side by side, and each comprise an upper and lower spring arm 6 and 7 respectively, said arms being connected by a spring loop 8. Each of the U-shaped spring members is formed from a single length of steel, rounded in cross section, and looped or coiled upon itself adjacent its central portion. The extremities of the lower arms 7 of these spring members project beyond the extremities of the upper arms, and are flattened and bent downwardly as indicated at 9.

The extremities of the lower arms of the spring members are connected, by means of a bolt 10 passing through an eye 11 formed on the bracket 12, which bracket is bolted as at 13 to the hub above the axle.

The spring coils 8 are connected to the leaves of the spring 4 of the vehicle through the medium of a clip. This clip includes a cross piece 14 against which the spring coils are held by means of hooks 15 formed at the upper end of bolts 16, which bolts connect the cross piece 14 on opposite sides of the spring leaves, with a second cross piece 17 which is arranged below the leaves, the nuts 18 being provided for tightening the bolts in place. The cross piece 14 is arranged above the spring leaves, and interposed between this cross piece and the leaves is a plate 19 provided with slots through which the bolts 16 pass.

A cross head 20 connects the ends of the upper arms of the spring members, the extremities of the arms being provided with eyes fitting over the reduced ends of the cross head and retained in place by means of washers and cotter pins or the like. The bolt 21, threaded at its upper end, projects through an opening in the central portion of the cross head, and is equipped with an adjusting nut 22. The lower headed end of the bolt passes through a U-shaped clip 23 connected by a pin or bolt 24 to the spring eye. This bolt 21 thus serves as a means of connection between the upper arms of the springs of the shock absorber and the end of the vehicle spring. By adjusting the nut 22, the tension under which the shock absorber springs are placed may be adjusted, whereby to suit the various conditions of service to which the vehicle is to be subjected.

A plate 25 has its ends bent over the flattened portions adjacent the extremities of the lower arms of the shock absorber springs, and rivets or bolts serve to secure the flanges of the plate to these arms. The plate is provided with a slot 26, arranged in parallel relation with the axle, and through the slot the bolt 21 projects, the slot allowing movement of the bolt relatively to the plate under the influence of the side sway of the car body. In order to assist in checking excessive rebound, an auxiliary or rebound spring of coiled type, indicated at 27 is interposed between the clip 23 and plate 25, said spring surrounding the bolt 21. This spring, under service conditions will assist in checking and take up the rebounds occurring after compression of the shock absorber springs. In order to prevent the cross head from striking the plate, due to excessive compression of the spring, a resilient bumper 28 is placed on the bolt 21 above the plate 25. This bumper is provided with an opening through which the bolt extends.

The type of spring ordinarily used in devices of this nature, is a coiled spring, and I have found that with a coiled spring the compression, or expansion, whichever the case may be, resulting from the efforts of the spring to take up the road shocks, causes an excessive rebound. With the type of spring I use, the rebound is relatively small, in comparison to that of the coiled spring, because of the fact that it takes but a little more force to compress it than it does to sustain the weight of the car. In other words the weight of the car places the spring in a state which might be described as one approaching equilibrium, wherein a little more force will readily compress or expand the spring in taking up road shocks.

It will be noted that should the car be overloaded, the ends of the upper spring arms will settle down against the bumper 28 carried by the supporting plate, and there remain until the load has been relieved. By thus providing a stop for the movement of the spring arms, danger of breaking the springs under excessive load will be eliminated. Furthermore, by thus suspending the vehicle spring a relatively great amount of play is allowed at the ends of the springs, and this will greatly ease and smooth out the rough riding qualities of the car.

In operation the weight of the car is transmitted through the car springs to the clips 23, and from them through the bolts 21 to the shock absorber springs and thence through the brackets 12 to the axle of the vehicle. Movements of the wheels in following the surface of the roadway are transmitted in a reverse direction, the road shocks being taken up through the medium of the shock absorbers, and over strains which overload the absorber being transmitted to and taken up by the vehicle springs themselves.

Although I have described the preferred embodiment of my invention, I may desire to make such changes in the construction, combination and arrangement of parts thereof as do not depart from the spirit of the invention and the scope of the appended claims.

I claim:—

1. The combination with a vehicle axle and spring, of a relatively U-shaped shock absorber spring including a pair of upper and a pair of lower resilient arms, spring coils connecting the arms, means connecting the lower spring arms with the axle, and means connecting the upper spring arms with the vehicle spring.

2. The combination with a vehicle axle and spring, of a relatively U-shaped shock absorber spring including a pair of upper and a pair of lower resilient arms, spring coils connecting the arms, means connecting the lower spring arms with the axle, a cross head connecting the upper spring arms together, a bolt passing through the cross head and pivotally connected with the vehicle spring, and means mounted on the bolt for adjusting the cross head relatively to the bolt.

3. The combination with a vehicle axle and spring of a substantially U-shaped shock absorber spring arranged above each end of the vehicle spring, connecting means between the lower arm of the shock absorber spring and the axle, means connecting the shock absorber spring intermediate its ends to the vehicle spring, and means connecting the upper arm of the shock absorber spring to the vehicle spring, said last named means allowing adjustment of the upper arm of the shock absorber spring relatively to the vehicle spring.

4. The combination with a vehicle axle and spring, of a substantially U-shaped shock absorber spring connected at one end with the axle, a plate carried by the shock absorber spring, a bolt having an oscillatory connection with the opposite end of the shock absorber spring, and with the vehicle spring, said bolt being passed through a guide slot in said plate.

5. The combination with a vehicle axle and spring of a substantially U-shaped shock absorber spring, means connecting the shock absorber intermediate its ends, to the vehicle spring, a pivotal connection between one end of the shock absorber spring and the axle, and an adjustable connection between the opposite end of the shock absorber spring and the vehicle spring.

6. A shock absorber comprising a relatively U-shaped spring, a plate carried by one arm of the spring, a bolt having an oscillatory connection with opposite arm of the spring and passing through an opening in the plate, a clip carried by the bolt whereby the latter may be connected with the vehicle spring, and a coiled spring interposed between the plate and the clip.

7. The combination with a vehicle axle and spring, of a relatively U-shaped shock absorber spring including a pair of upper and a pair of lower resilient arms, spring coils connecting the arms, means connecting the lower spring arms with the axle, means connecting the upper spring arms with the vehicle spring, and means connecting the spring coils to the vehicle spring.

THOMAS DAVIS.

Witnesses:
F. H. MORRIS,
W. MORRIS.